US011052501B1

(12) United States Patent
Midyette et al.

(10) Patent No.: US 11,052,501 B1
(45) Date of Patent: Jul. 6, 2021

(54) ON-WING TOOL FOR IN-SITU CUTTING ON WING-TO-FUSELAGE ATTACHMENT OF AIRCRAFT

(71) Applicant: The Government of the United States of America, as represented by the Secretary of Homeland Security, Washington, DC (US)

(72) Inventors: Mark Midyette, Elizabeth City, NC (US); Craig Deen, Elizabeth City, NC (US); Harlon Parchment, Elizabeth City, NC (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 16/934,645

(22) Filed: Jul. 21, 2020

Related U.S. Application Data

(60) Provisional application No. 63/009,264, filed on Apr. 13, 2020.

(51) Int. Cl.
    *B23Q 9/00*   (2006.01)
    *B23C 3/36*   (2006.01)
    *B23C 3/10*   (2006.01)

(52) U.S. Cl.
    CPC .............. *B23Q 9/0007* (2013.01); *B23C 3/10* (2013.01); *B23C 3/36* (2013.01); *B23C 2215/04* (2013.01); *B23Q 9/0028* (2013.01)

(58) Field of Classification Search
    CPC .... B23C 3/10; B23C 3/12; B23C 3/16; B23C 3/36; B23C 1/20; B23C 2215/04; B23C 2215/44; B23C 2220/04; B23C 2220/08; B23Q 9/0007; B23Q 9/0028
    See application file for complete search history.

(56) References Cited

U.S. PATENT DOCUMENTS

| | | | | |
|---|---|---|---|---|
| 3,757,637 A | * | 9/1973 | Eich ..................... | B23Q 16/028 409/230 |
| 4,022,106 A | * | 5/1977 | Kile ........................ | B23C 1/20 409/178 |
| 4,987,700 A | * | 1/1991 | Westerman .......... | B23Q 9/0014 451/127 |
| 5,106,243 A | * | 4/1992 | Hunt ....................... | B23C 1/20 144/24.05 |

(Continued)

*Primary Examiner* — Nicole N Ramos
(74) *Attorney, Agent, or Firm* — Lavanya Ratnam; Kelly G. Hyndman

(57) ABSTRACT

In one example, an on-wing apparatus for in-situ cutting on a wing-to-fuselage attachment includes a first linear bearing disposed on a first mount plate to move in a first direction. A second linear bearing is disposed on a second mount plate to move in a second direction. The second mount plate is attached to the first linear bearing. A tool mounting member is attached to the second linear bearing. A cutter is attached to the tool mounting member to be adjustable, relative to the second linear bearing, in a rotational direction around an adjustment axis. One of the first direction and the second direction is a depth direction of the cut parallel to the adjustment axis, and the other is a length direction of the cut. A width position of the cut is determined by rotational adjustment of the cutter with respect to the second linear bearing in the rotational direction.

14 Claims, 12 Drawing Sheets

(56) References Cited

U.S. PATENT DOCUMENTS

| | | | | |
|---|---|---|---|---|
| 5,152,643 A * | 10/1992 | McGettigan | ............... | B23C 3/00 |
| | | | | 409/175 |
| 5,161,291 A * | 11/1992 | Guenther | ................ | B23C 3/00 |
| | | | | 29/56.5 |
| 5,533,845 A * | 7/1996 | Glover | ..................... | B23C 1/20 |
| | | | | 408/130 |
| 5,661,892 A * | 9/1997 | Catania | ................... | B21J 15/10 |
| | | | | 29/525.02 |
| 5,667,000 A * | 9/1997 | Bean | .................... | B23Q 9/0014 |
| | | | | 144/136.7 |
| 7,273,333 B2 * | 9/2007 | Buttrick, Jr. | ......... | B23Q 9/0042 |
| | | | | 408/1 R |
| 2004/0234352 A1 * | 11/2004 | Vanderpol | .............. | B23C 3/126 |
| | | | | 409/178 |
| 2005/0198821 A1 * | 9/2005 | Reville | .................... | B23P 6/00 |
| | | | | 29/889.1 |
| 2010/0074703 A1 * | 3/2010 | Makiyama | ........... | B23Q 1/4852 |
| | | | | 408/146 |
| 2016/0256972 A1 * | 9/2016 | Reid | .................... | B23Q 9/0042 |
| 2016/0279718 A1 * | 9/2016 | Capriotti | .................. | B23C 9/00 |

\* cited by examiner

ON-WING TOOL FOR IN-SITU CUTTING ON WING-TO-FUSELAGE ATTACHMENT OF AIRCRAFT

CROSS-REFERENCE TO RELATED APPLICATIONS

The application claims the benefit of priority from U.S. Provisional Patent Application No. 63/009,264, filed Apr. 13, 2020, entitled ON-WING TOOL FOR IN-SITU CUTTING ON WING-TO-FUSELAGE ATTACHMENT OF AIRCRAFT, the disclosure of which is incorporated by reference in its entirety.

STATEMENT OF GOVERNMENT INTEREST

The present invention was made by employees of the United States Department of Homeland Security in the performance of their official duties. The U.S. Government has certain rights in this invention.

FIELD

The discussion below relates generally to apparatuses and methods of cutting and, more specifically, to an on-wing milling tool for in-situ cutting on a wing-to-fuselage attachment of an aircraft.

BACKGROUND

This section provides a brief introduction to the technical subject matter without distinguishing what aspects of the technology are or are not in the prior art. Nothing in this section amounts to an admission regarding the prior art.

Fretting refers to wear and sometimes corrosion damage at the asperities of contact surfaces. This damage is induced under load and in the presence of repeated relative surface motion by vibration or some other force. Fretting tangibly degrades the surface layer quality producing increased surface roughness and micropits, which reduces the fatigue strength of the components. The amplitude of the relative motion is often in the order from micrometers to millimeters but may also be down in the order of nanometers. The contact movement causes mechanical wear and material transfer at the surface, often followed by oxidation of both the metallic debris and the freshly exposed metallic surfaces. Because the oxidized debris is usually much harder than the surfaces from which it came, it often acts as an abrasive agent that increases the rate of fretting.

Fretting has been discovered at certain contact regions between the wing attachment fitting and the fuselage attachment fitting at the wing-to-fuselage connection between the primary wing and the fuselage. The unwanted contact creates fretting corrosion and an asymmetric loading condition within the wing-to-fuselage attachment fittings that form the wing-to-fuselage connection. One approach of eliminating the unwanted contact and interference between the wing and the fuselage at the contact regions is by manual cutting and filing using common hand tools such as draw files and hand-held grinders. Performing such type of repair on a Principal Structural Element (PSE) in a non-precision manner is of great concern regarding the accuracy of the repair and potential damage to the airframe. Alternatively or additionally, removing the wing from the aircraft to perform repair would be costly and time consuming, and introduce other risks.

SUMMARY

Embodiments of the present invention are directed to apparatuses and methods for in-situ cutting on a wing-to-fuselage attachment of an aircraft, for instance, to eliminate unwanted contact, fretting corrosion, and asymmetric loading conditions within the wing-to-fuselage attachment fittings. As used herein, the term "on-wing" is used to describe maintenance of or a tool used in the maintenance of an aircraft without removing, from the aircraft, an aircraft component such as the wing by disassembling the wing attachment fitting and the fuselage attachment fitting that form the wing-to-fuselage attachment of the aircraft. A small cutting or milling tool (the size of a hand-held-type) is used for cutting. An apparatus for securely mounting the milling tool to the aircraft is constructed to fit in the tight space in the vicinity of the wing-to-fuselage attachment. The apparatus utilizes linear bearings and rotational adjustments to provide precise adjustment of the depth and width of the cut and precise control of making the cut in the length direction. The apparatus advantageously achieves controlled material removal from the attachment fitting to alleviate contact fretting and contact loads without collateral damage to the airframe.

According to embodiments of the present invention, a pneumatic rotary milling cutter is securely mounted to the base or flange of the wing attachment fitting via a pair of linear bearings that provide stable precise articulation on the fitting surface of the fuselage attachment fitting to control the length and depth of the cut. Movement of each linear bearing is controlled by a knob and the linear bearing advances by about 0.01 inches or about 0.25 mm with each 360° rotation of the knob. The width position of the milling cutter is adjusted in the width direction by manipulating the mounting mechanism that mounts the milling cutter to the linear bearings. Cutting is repeated at different width positions to achieve the desired width of the overall cut. The repair is done precisely and safely without any collateral damage to the airframe. The repair is much less time-consuming and costly than one that requires the removal of the wing from the aircraft.

An aspect of the present invention is directed to an on-wing apparatus for in-situ cutting on a wing-to-fuselage attachment of a wing and a fuselage of an aircraft. The on-wing apparatus comprises: a first linear bearing disposed on a first mount plate to provide movement in a first linear direction with respect to the first mount plate, the first mount plate being configured to be attached to the aircraft in vicinity of the wing-to-fuselage attachment; a second linear bearing disposed on a second mount plate to provide movement in a second linear direction with respect to the second mount plate, the second mount plate being attached to the first linear bearing to move with the first linear bearing; a tool mounting member attached to the second linear bearing to move with the second linear bearing; and a cutter attached to the tool mounting member to be adjustable, relative to the second linear bearing, in a tool mount rotational direction around an adjustment axis. One of the first linear direction and the second linear direction is a depth direction of a depth of a cut to be made on the wing-to-fuselage attachment, which is parallel to the adjustment axis, and the other of the first linear direction and the second linear direction is a length direction of a length of the cut. A width position of the cut is determined by a rotational adjustment of the cutter with respect to the second linear bearing in the tool mount rotational direction around the adjustment axis.

Another aspect of this invention is directed to an on-wing method for in-situ cutting on a wing-to-fuselage attachment of a wing and a fuselage of an aircraft. The on-wing method comprises: attaching a first mount plate to the aircraft in vicinity of the wing-to-fuselage attachment, wherein a first linear bearing is disposed on the first mount plate to provide movement in a first linear direction with respect to the first mount plate; attaching a second mount plate to the first linear bearing to move with the first linear bearing, wherein a second linear bearing is disposed on the second mount plate to provide movement in a second linear direction with respect to the second mount plate; attaching a tool mounting member to the second linear bearing to move with the second linear bearing; attaching a cutter to the tool mounting member to be adjustable relative to the second linear bearing; adjusting a depth position of a cut to be made on the wing-to-fuselage attachment, by adjusting one of (i) the first linear bearing in the first linear direction and (ii) the second linear bearing in the second linear direction, along a depth direction of the cut; adjusting a width position of the cut by adjustment of the cutter with respect to the second linear bearing in a width direction of the cut which is perpendicular to the depth direction; and moving the other one of (i) the first linear bearing in the first linear direction and (ii) the second linear bearing in the second linear direction, along a length direction of the cut which is perpendicular to the depth direction and the width direction, to make the cut on the wing-to-fuselage attachment along the length direction at the adjusted depth position and the adjusted width position.

Another aspect of the invention is directed to an on-wing apparatus for in-situ cutting on a wing-to-fuselage attachment of a wing and a fuselage of an aircraft. The on-wing apparatus comprises: a first mount plate configured to be attached to the aircraft in vicinity of the wing-to-fuselage attachment; a second mount plate; a mechanism for moving the second mount plate relative to the first mount plate in a first linear direction; a tool mounting center portion; a mechanism for moving the tool mounting center portion relative to the second mount plate in a second linear direction; a cutter; and a mechanism for attaching the cutter to the tool mounting center portion to be adjustable relative to the tool mounting center portion. One of the first linear direction and the second linear direction is a depth direction of a depth of a cut to be made on the wing-to-fuselage attachment, and the other of the first linear direction and the second linear direction is a length direction of a length of the cut. A width position of the cut is determined by adjusting the cutter with respect to the tool mounting center portion in a width direction which is perpendicular to the depth direction and the length direction.

Other features and aspects of the invention will become apparent from the following detailed description, which taken in conjunction with the accompanying drawings illustrate, by way of example, the features in accordance with embodiments of the invention. This summary is not intended to identify key or essential features of the claimed subject matter, nor is it intended to limit the scope of the invention, which is defined solely by the claims attached hereto.

BRIEF DESCRIPTION OF THE DRAWINGS

The attached drawings help explain the embodiments described below.

DETAILED DESCRIPTION

Figure 1:
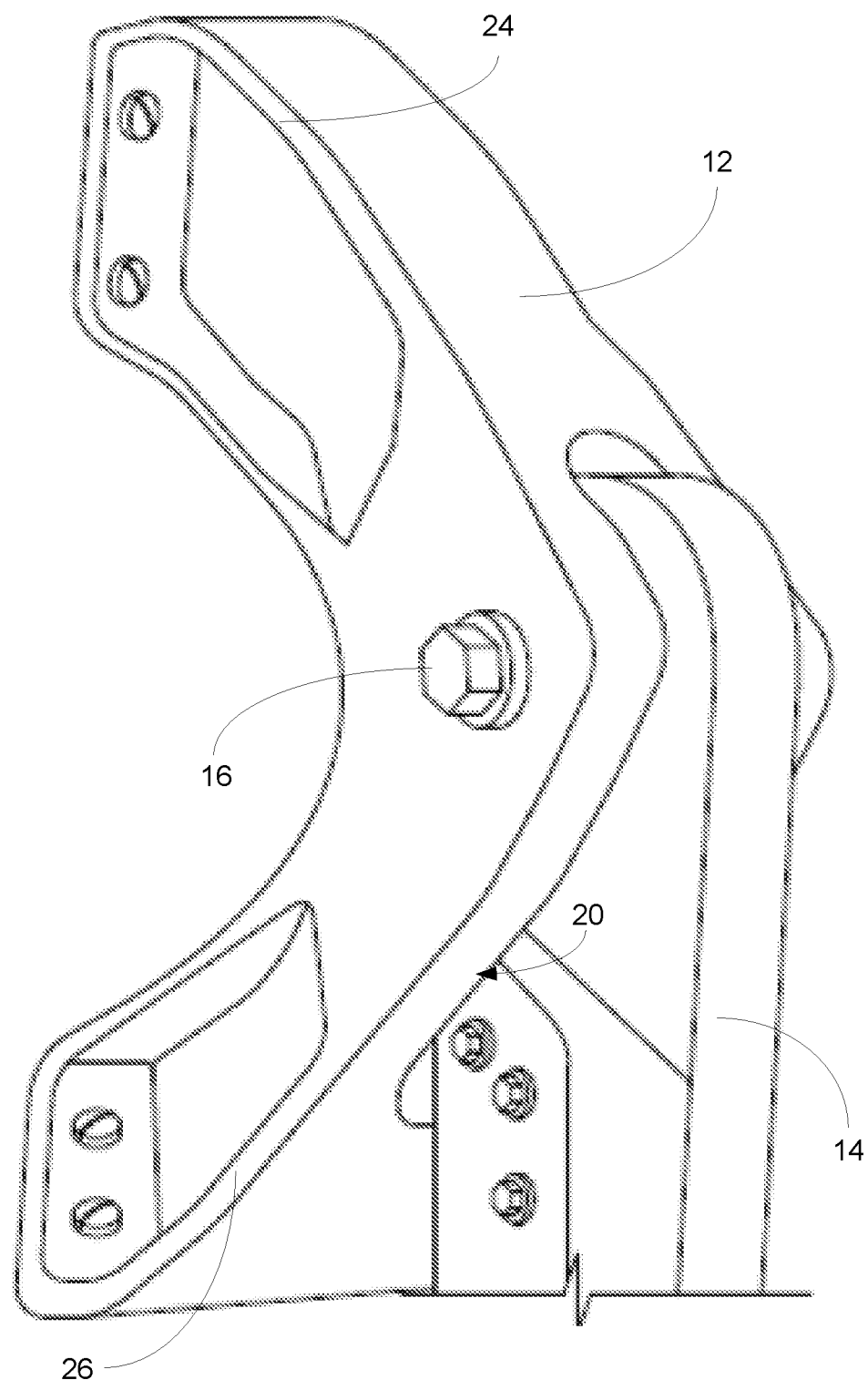
FIG. 1 shows an example of a wing-to-fuselage connection between a wing attachment fitting and a fuselage attachment fitting illustrating a contact region where fretting may occur.

FIG. 1 shows an example of a wing-to-fuselage connection between a wing attachment piece or fitting 12 and a fuselage attachment piece or fitting 14 attached by a bolt 16 or the like. In this particular example, the wing attachment fitting 12 is attached to a trailing edge of the wing and may be referred to as a trailing-edge wing attachment fitting 12. Unwanted contact and fretting may occur at a generally linear contact region 20 between a corner area of the wing attachment fitting 12 and a fitting surface of the fuselage attachment fitting 14. If FIG. 1 shows a right side wing-to-fuselage connection, the contact region 20 is on the inboard side. If FIG. 1 shows a left-side wing-to-fuselage connection, the contact region 20 is on the outboard side. In specific situations, unwanted contact is observed on the inboard sides of the wing-to-fuselage connections only.

Figure 2:
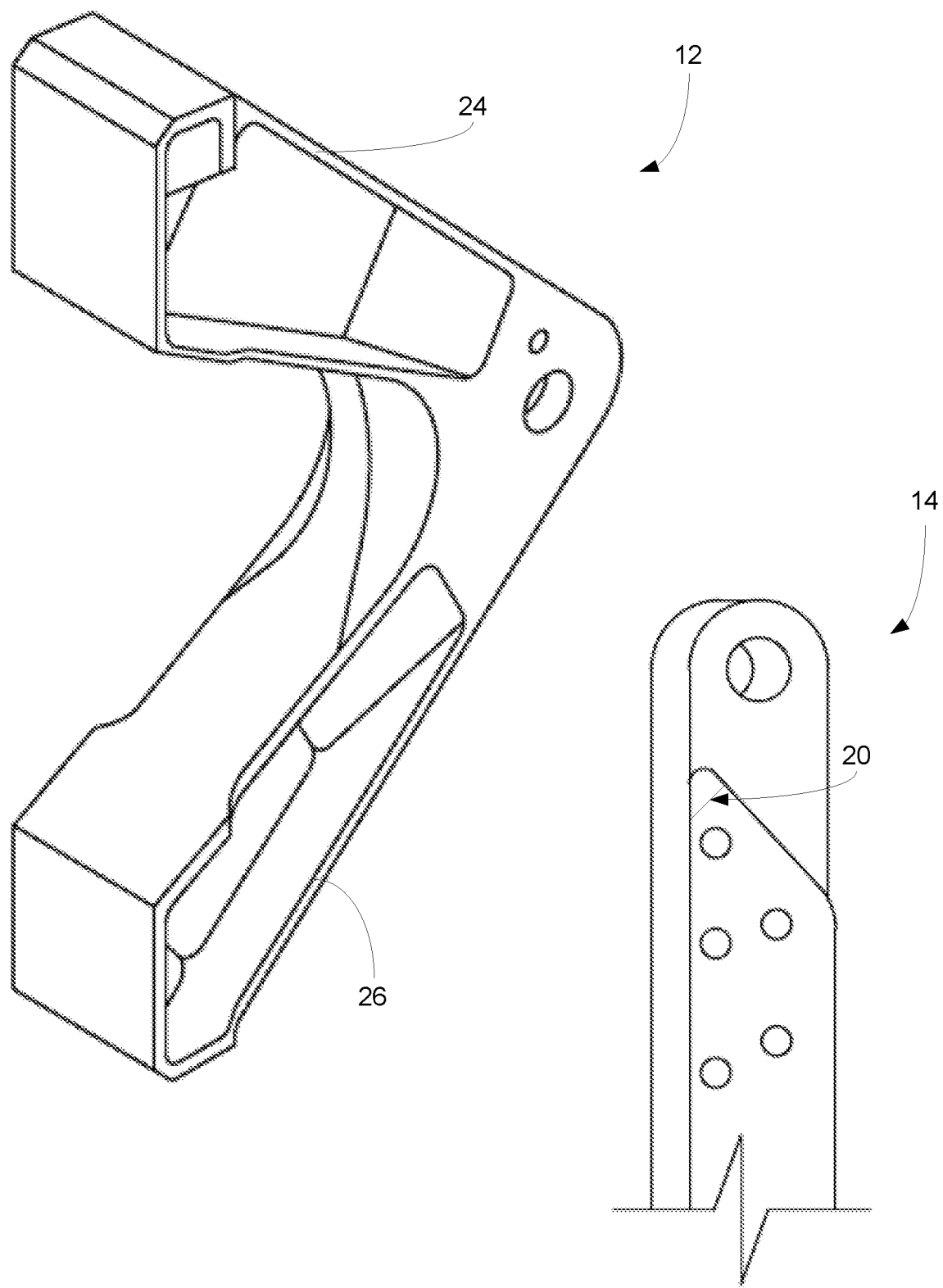
FIG. 2 is an exploded view of the wing-to-fuselage connection of FIG. 1.

FIG. 2 is an exploded view of the wing-to-fuselage connection of FIG. 1. To eliminate the interference, it is recommended to reduce the thickness of at least one of the parts at the contact region 20 to provide a gap of, e.g., about 1 mm between the two parts 12, 14 at the contact region 20 along the entire length of the contact region 20 and a prescribed width thereof. According to one embodiment of the present invention, an on-wing cutter is mounted to the wing attachment fitting 12 to cut the fitting surface of the fuselage attachment fitting 14 at the contact region 20 to form a gap or clearance along the entire length in the X-direction with a depth in the Y-direction to reduce the thickness of the fuselage attachment fitting 14 and a width in the Z-direction. At the base of the wing attachment fitting 12 are an upper flange 24 and a lower flange 26 which provide two alternative locations to which a cutting tool can be securely mounted to perform the cutting on the fitting surface of the fuselage attachment fitting 14 at the contact region 20. Because the lower flange 26 is in closer proximity to the contact region 20, it is a more likely location for mounting the on-wing cutter. A variety of cutting tools can be adapted for making the cut. The selection of the tool takes into consideration the limited space available, the safety desired to reduce or eliminate collateral damage to the airframe, and the desired precision of the cut. Embodiments of this invention utilize a milling tool.

Figure 3:
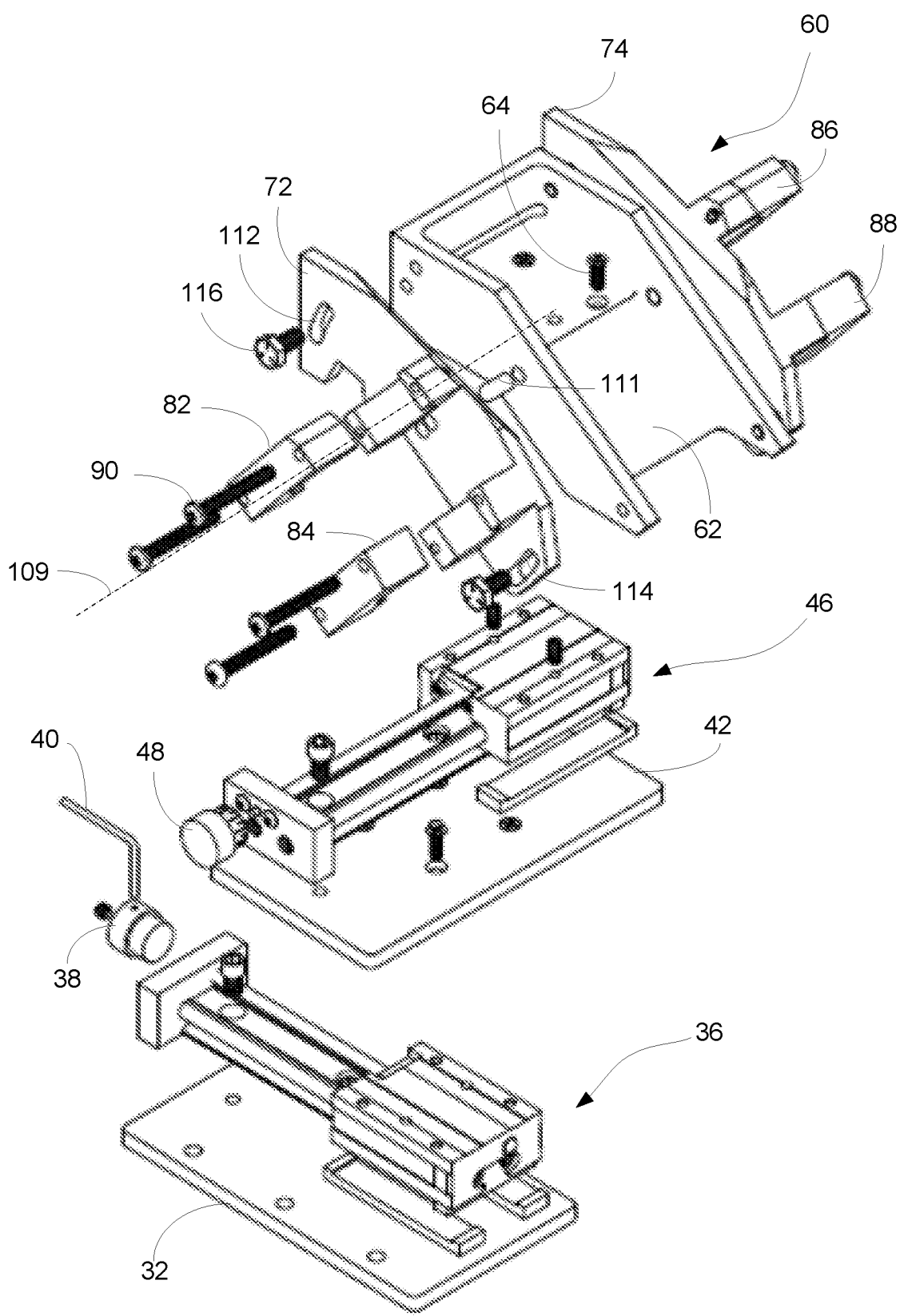
FIG. 3 is an exploded view of an apparatus for mounting a cutting tool such as a milling tool to the aircraft in the vicinity of the wing-to-fuselage connection for cutting in the contact region.

FIG. 3 is an exploded view of an apparatus for mounting a milling tool to the aircraft in the vicinity of the wing-to-fuselage connection for cutting in the contact region 20. A bottom (first) mount plate 32 is to be mounted to the lower flange 26 of the wing attachment fitting 12 of FIGS. 1 and 2. A first linear bearing 36 is disposed on the first mount plate 32 to provide sliding movement in a first linear direction (X-direction) with respect to the first mount plate 32. A first knob 38 and a handle 40 are used to move the first linear bearing 36 in the first linear direction. A top (second) mount plate 42 is attached to the first bearing 36 to move with the first linear bearing 36. A second linear bearing 46 is disposed on the second mount plate 42 to provide sliding movement in a second linear direction (Y-direction) which is typically perpendicular to the first linear direction. A second knob 48 is used to move the second linear bearing 46 in the second linear direction. Because linear bearings are well known, this disclosure omits the description of the details of the individual components of the linear bearings and how they are connected to the mount plates. In specific embodiments, the linear bearing (36, 46) advances by about 0.01 inches or 0.25 mm with each 360° rotation of the corresponding knob (38, 48).

Figure 4A:
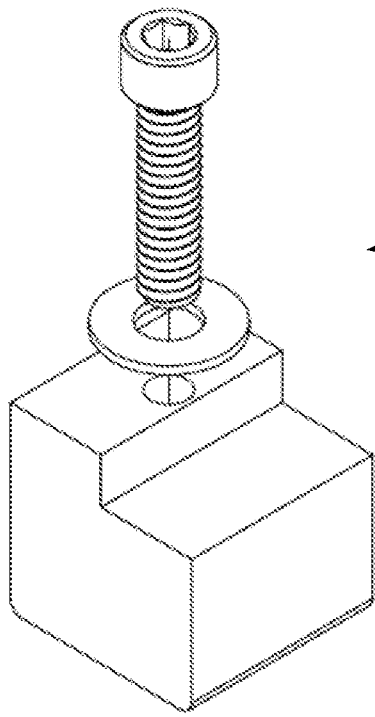
FIGS. 4A and 4B show examples of bottom mounts for mounting a bottom mount plate of the apparatus of FIG. 3 to a flange of the wing attachment fitting.
Figure 4B:
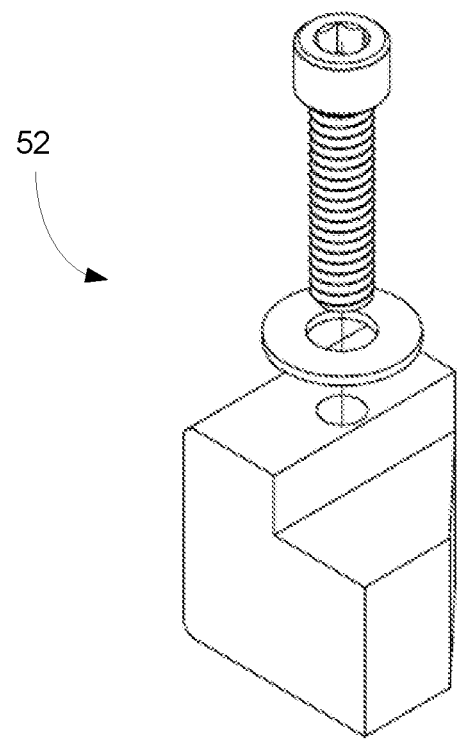

FIGS. 4A and 4B show examples of bottom mounts for mounting the bottom mount plate 32 to the lower flange 26 of the wing attachment fitting 12. A side bottom mount 50 includes a mounting block and a fastener (such as a screw and a washer) to fasten or clamp the side of the bottom mount plate 32 to the lower flange 26. In one embodiment, two side bottom mounts 50 are used to mount one side of the bottom mount plate 32 to one side of the flange and two side bottom mounts 50 are used to mount an opposite side of the bottom mount plate 32 to an opposite side of the flange. In some cases, a corner bottom mount 52 is used instead of a side bottom mount 50 at a corner area of the bottom mount plate 32 due to space restrictions or the like. The mounting block of the corner bottom mount 52 has a portion truncated, for instance, to accommodate spatially a feature at the wing attachment fitting 12 such as a protrusion or the like. The side bottom mount 50 and corner bottom mount 52 are also referred to as aircraft mounts for mounting the apparatus of FIG. 3 to the aircraft.

As shown in FIG. 3, a tool mounting member or tool mount or tool carrier 60 includes a tool mounting center portion or center block 62 that is attached to the second linear bearing 46 to move with the second linear bearing 46 using, for instance, a plurality of countersunk screws 64. The center block 62 has two sides: a left side and a right side. Conveniently and advantageously, the milling tool can be mounted to either the left side or the right side of the center block 62 to perform cutting (i) on the inboard side or the outboard side of the wing-to-fuselage connection on the left side of the aircraft, or (ii) on the inboard side or the outboard side of the wing-to-fuselage connection on the right side of the aircraft.

The tool mounting member 60 includes a left (first) side panel 72 and a right (second) side panel 74 for mounting the milling tool to the left (first) side and the right (second) side of the center block 62, respectively. The left side panel 72 and right side panel 74 may be mirror images of one another. The components for mounting the milling tool to the side panel (72, 74) are configured depending on the shape and size of the milling tool. In specific embodiments, the milling tool housing is generally circular cylindrical but has circular cross-sections with different diameters along the length of the longitudinal axis of the housing. Accordingly, a pair of mounts that are used for each side panel typically have different sizes to accommodate different diameter cross-sections of the milling tool housing. FIG. 3 shows, for the left side panel 72 on the left side, a left large mount 82 for a larger diameter cross-section and a left small mount 84 for a smaller diameter cross-section of the milling tool housing, and, for the right side panel 74 on the right side, a right large mount 86 for a larger diameter cross-section and a right small mount 88 for a smaller diameter cross-section of the milling tool housing.

Figure 5:
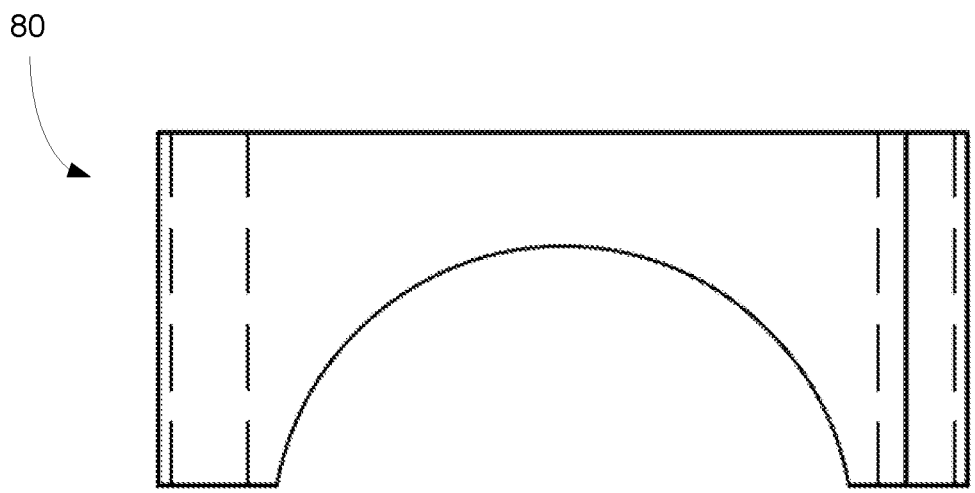
FIG. 5 shows an example of a milling tool housing mount of the tool mounting member in the apparatus of FIG. 3 for mounting the milling tool.

FIG. 5 shows an example of a milling tool housing mount 80 of the tool mounting member 60. The milling tool housing mount 80 can be any of the mounts 82, 84, 86, 88 in FIG. 3 having a semicircular edge with the appropriate diameter to fit around the milling tool housing at a specific mounting location. As seen in FIG. 3, the side panels (72, 74) each provide a pair of mount connections having corresponding semicircular edges to match those of the two milling tool housing mounts, to fit around and hold the milling tool housing at two spaced-apart locations. The milling tool housing mounts (82, 84, 86, 88) are attached to the mount connections of the corresponding side panels (72, 74) respectively by bolts or screws (90) or the like.

Figure 6:
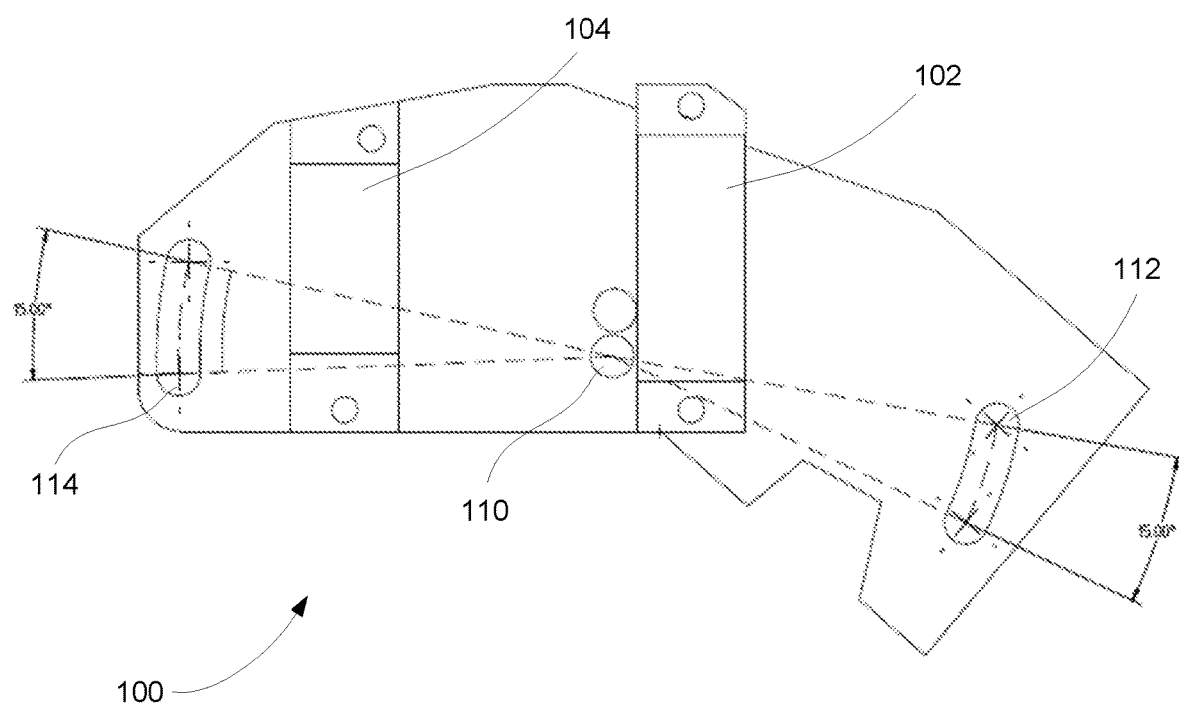
FIG. 6 shows a side panel in the apparatus of FIG. 3 according to a specific embodiment.

FIG. 6 shows a side panel 100 according to a specific embodiment. The side panel 100 corresponds, for example, to the right side panel 74 or mirror image of the left side panel 72. The side panel 100 has a large mount connection 102 for connecting with the large mount (82, 86) and a small mount connection 104 for connecting with the small mount (84, 88). The side panel 100 is rotatably attached to the side of the center block 62 at a pivot location 110 by a stud 111 (see FIG. 3). The pivot location 110 facilitates rotation of the side panel 100 with respect to the center block 62 in a tool mount rotational direction around an adjustment axis 109 that is the axis of the stud 111, which is parallel to the second linear direction of the second linear bearing 46. The rotation provides adjustment of the width position (Z-direction) of the milling tool over the cut to be made on the fuselage attachment fitting 14 at the contact region 20. A slot 114 spaced from the pivot location 110 allows the rotational adjustment to a plurality of possible positions along the slot 114. After the desired width position is achieved by selecting a corresponding position of the plurality of possible positions along the slot 114, the side panel 100 is releasably fastened to the center block 62 by a fastener (such as a bolt or a screw 116 in FIG. 3) through the slot 114 to an opening in the center block 62. The fastener can be released to adjust the slot position and tightened to fix the selected slot position and the corresponding width position of the cut. For a more stable attachment to facilitate more precise controlled cutting, another slot 112 is provided generally on the opposite side of the pivot location 110 from the slot 114 and another fastener is used to releasably fasten the side panel 100 to the center block 62 through the other slot 112 to another opening in the center block 62. In the specific embodiment shown in FIG. 6, the slots 114, 112 are curvilinear slots centered around the pivot location 110 spanning about 15°. The slots 114, 112 may be, but need not be, directly opposite from one another in angular position with respect to the pivot location 110. In FIG. 6, the slots 114, 112 are angularly offset with respect to the pivot location 110. In this way, the apparatus for mounting the milling tool to the wing-to-fuselage connection for cutting in the contact region 20 can be configured to facilitate precision cutting to achieve the desired width of the cut in a tight space without collateral damage to the airframe.

As mentioned above in connection with FIG. 3, the milling tool can be mounted to either the left side of the center block 62 using the left side panel 72 or to the right side of the center block 62 using the right side panel 74 to perform cutting (i) on the inboard side or the outboard side of the wing-to-fuselage connection on the left side or (ii) on the inboard side or the outboard side of the wing-to-fuselage connection on the right side of the aircraft. As such, the left side panel 72 and right side panel 74 are preferably mirror images of one another, with corresponding slots 114 that are aligned and corresponding slots 112 that are aligned in a direction parallel to the adjustment axis 109.

In the embodiment shown in FIG. 6, the slots 114, 112 are provided in the side panel 100. In a different embodiment, one or more slots may be provided in the center block 62 instead to achieve the rotational adjustment between the side panel 100 and the center block 62. Having the slots on the side panel 100 may allow the operator or user to visualize the rotational adjustment more easily and make rotational adjustments in a more intuitive manner.

Figure 7:
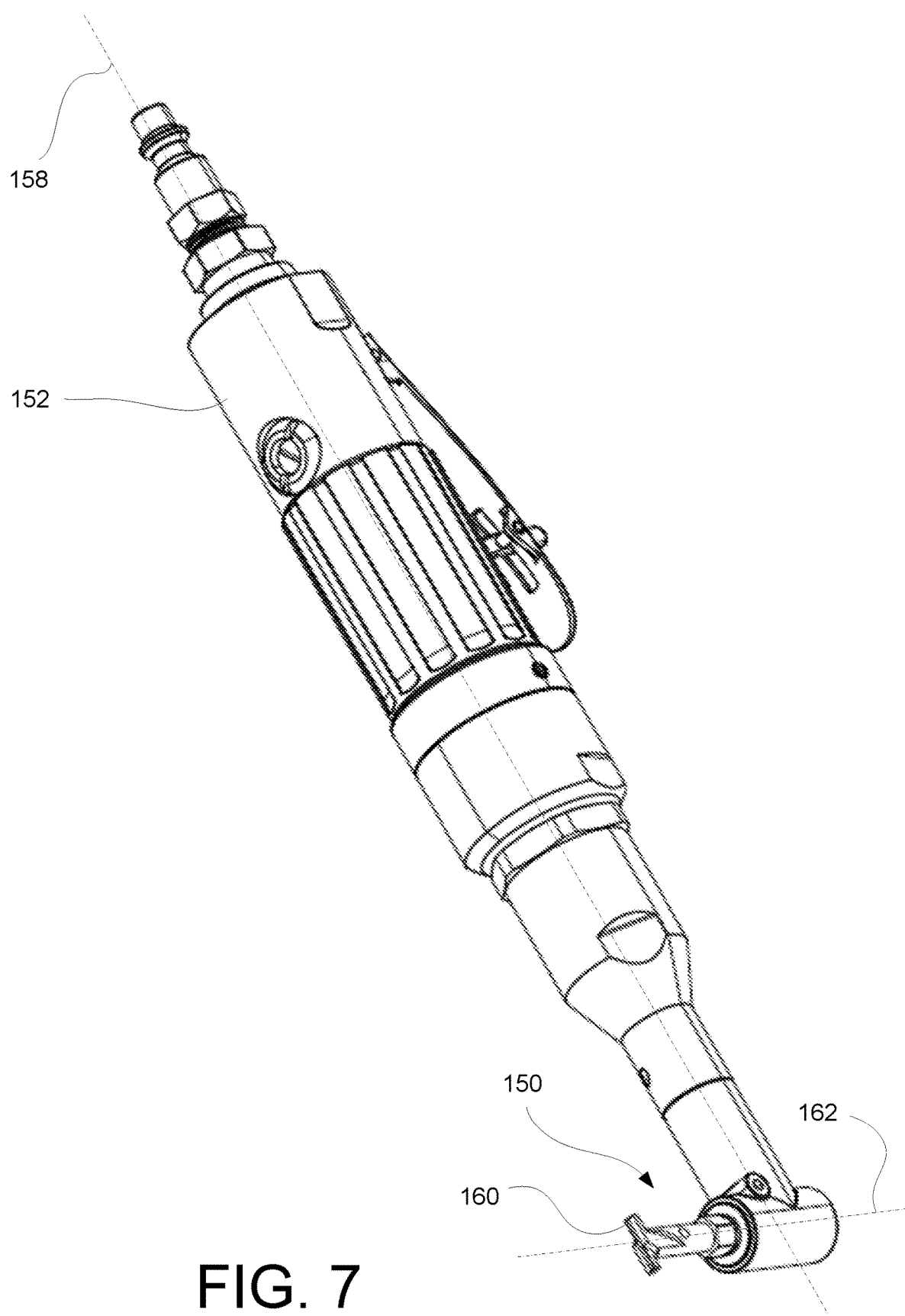
FIG. 7 is a perspective view of a milling tool having a milling tool housing.

FIG. 7 is a perspective view of a milling tool 150 having a milling tool housing 152. A rotary motor is disposed inside the housing 152 to provide rotational drive to a drive shaft oriented along a rotary motor axis 158. A milling cutter 160 is connected to the drive shaft at a right angle to be driven to rotate around a rotational cutter axis 162 for cutting the fuselage attachment fitting 14 in the contact region 20. The rotational cutter axis 162 is perpendicular to the rotary motor axis 158.

Figure 8:
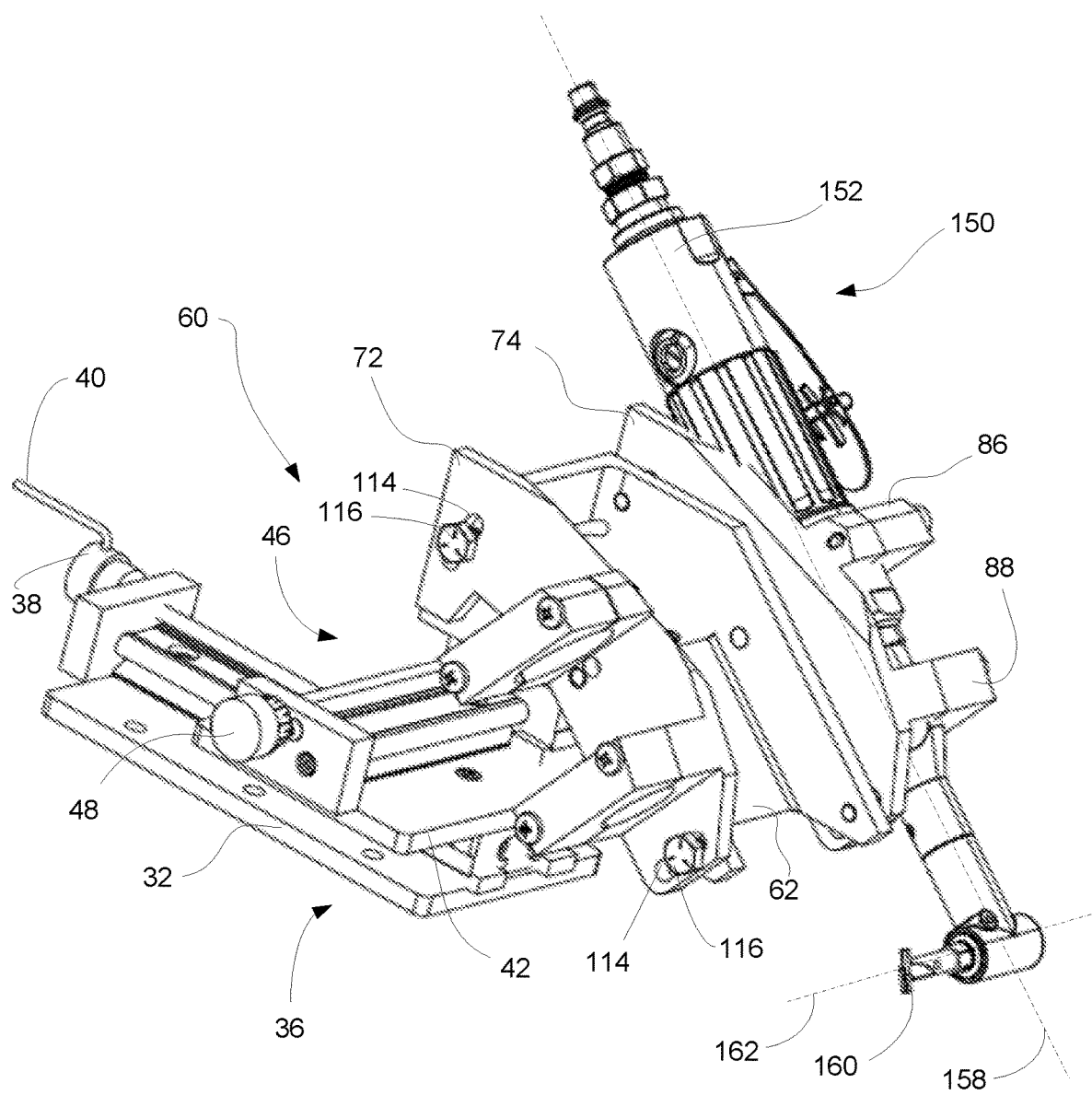
FIG. 8 is a perspective view of the milling tool housing of FIG. 7 attached to the apparatus of FIG. 3.

FIG. 8 is a perspective view of the milling tool housing of FIG. 7 attached to the apparatus of FIG. 3. The housing 152 is mounted between the center block 62 and the right side panel 74 using the right small mount 88 and the right large mount 86. The milling tool housing 152 is generally circular cylindrical but has circular cross-sections with different diameters along the length of the longitudinal axis of the housing. The right small mount 88 is used to mount the portion of the housing 152 having a smaller diameter near the front end and the left large mount 86 is used to mount the portion of the housing 152 having a larger diameter near the rear end. This attachment arrangement is used the mount the milling tool housing 152 to the outboard side of the right wing of the aircraft. The outboard side is opposite from the inboard side and, for comparison and contrast and to demonstrate the versatile design of the embodiment described herein, mounting for the inboard side is seen in FIGS. 9 and 10.

Figure 9:
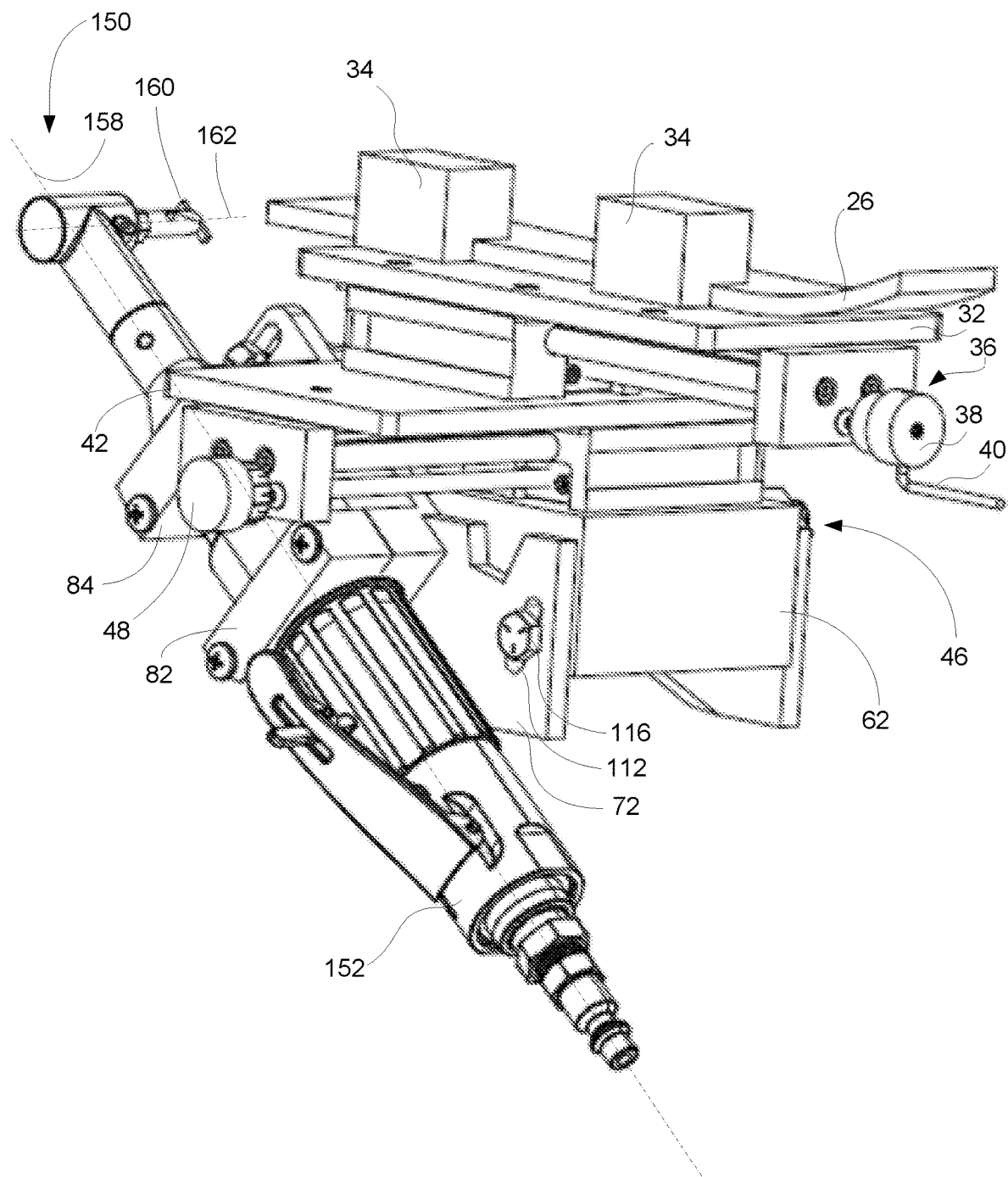
FIG. 9 shows one perspective view of the milling tool housing of FIG. 7 mounted to the inboard side of the right wing of the aircraft using the apparatus of FIG. 3.
Figure 10:
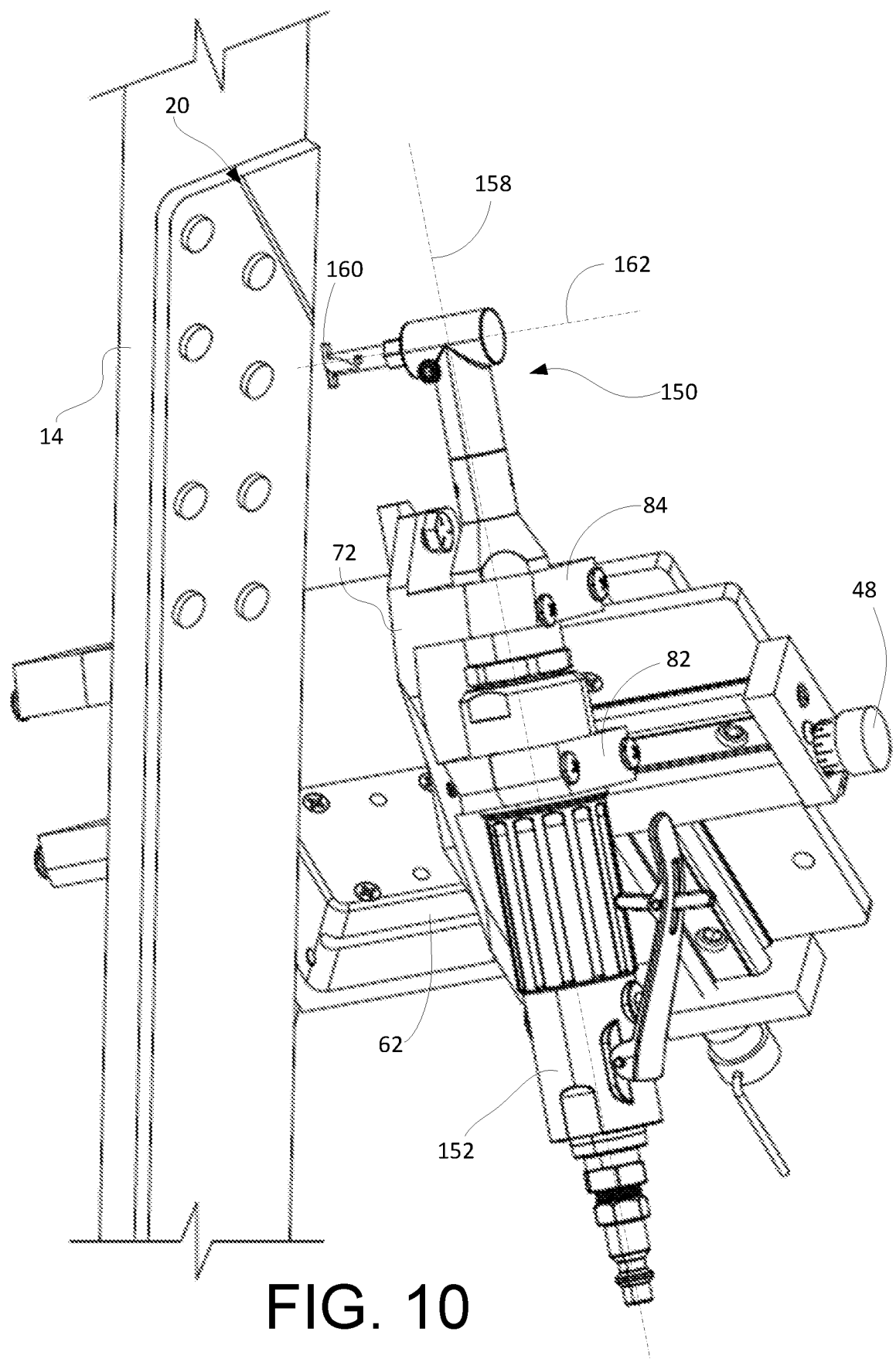
FIG. 10 shows another perspective view of the milling tool housing of FIG. 7 mounted to the inboard side of the right wing of the aircraft using the apparatus of FIG. 3.

FIGS. 9 and 10 show perspective views of the milling tool housing 152 mounted to the inboard side of the right wing of the aircraft using the apparatus of FIG. 3. The housing 152 is mounted between the center block 62 and the left side panel 72 using the left small mount 84 and the left large mount 82. The milling tool housing 152 is generally circular cylindrical but has circular cross-sections with different diameters along the length of the longitudinal axis of the housing. The left small mount 84 is used to mount the portion of the housing 152 having a smaller diameter near the front end and the left large mount 82 is used to mount the portion of the housing 152 having a larger diameter near the rear end.

The first mount plate 32 is mounted to the lower flange 26 of the wing attachment fitting 12 using a plurality of mounts 34. Typically, as shown, two mounts 34 are used on each side. The first linear bearing 36 is disposed on the first mount plate 32 to provide sliding movement in a first linear direction with respect to the first mount plate 32. The first knob 38 is used to move the first linear bearing 36 in the first linear direction. The second mount plate 42 is attached to the first bearing 36 to move with the first linear bearing 36. The second linear bearing 46 is disposed on the second mount plate 42 to provide sliding movement in the second linear direction which is typically perpendicular to the first linear direction. The second knob 48 is used to move the second linear bearing 46 in the second linear direction.

As described above, the rotational cutter axis 162 of the milling cutter 160 is perpendicular to the rotary motor axis 158. The rotational cutter axis 162 is parallel to the adjustment axis 109 (FIG. 3); the left side panel 72 is rotated in the tool mount rotational direction around the adjustment axis 109 relative to the center block 62 at the pivot location 110 to adjust the width position of the cut by the milling cutter 160. The slots 112, 114 allow the rotational adjustment to a plurality of possible positions along the slots and, after the desired rotational adjustment is made, the left side panel 72 is releasably fastened to the center block 62 by the fasteners 116 through the slots 112, 114 to openings in the center block 62. The fasteners 116 can be released to make rotational adjustments and tightened to fix the selected position. In the embodiment shown in FIGS. 9 and 10, the rotational cutter axis 162 and the adjustment axis 109 are parallel to the second linear direction of the second linear bearing 46.

Figure 11:
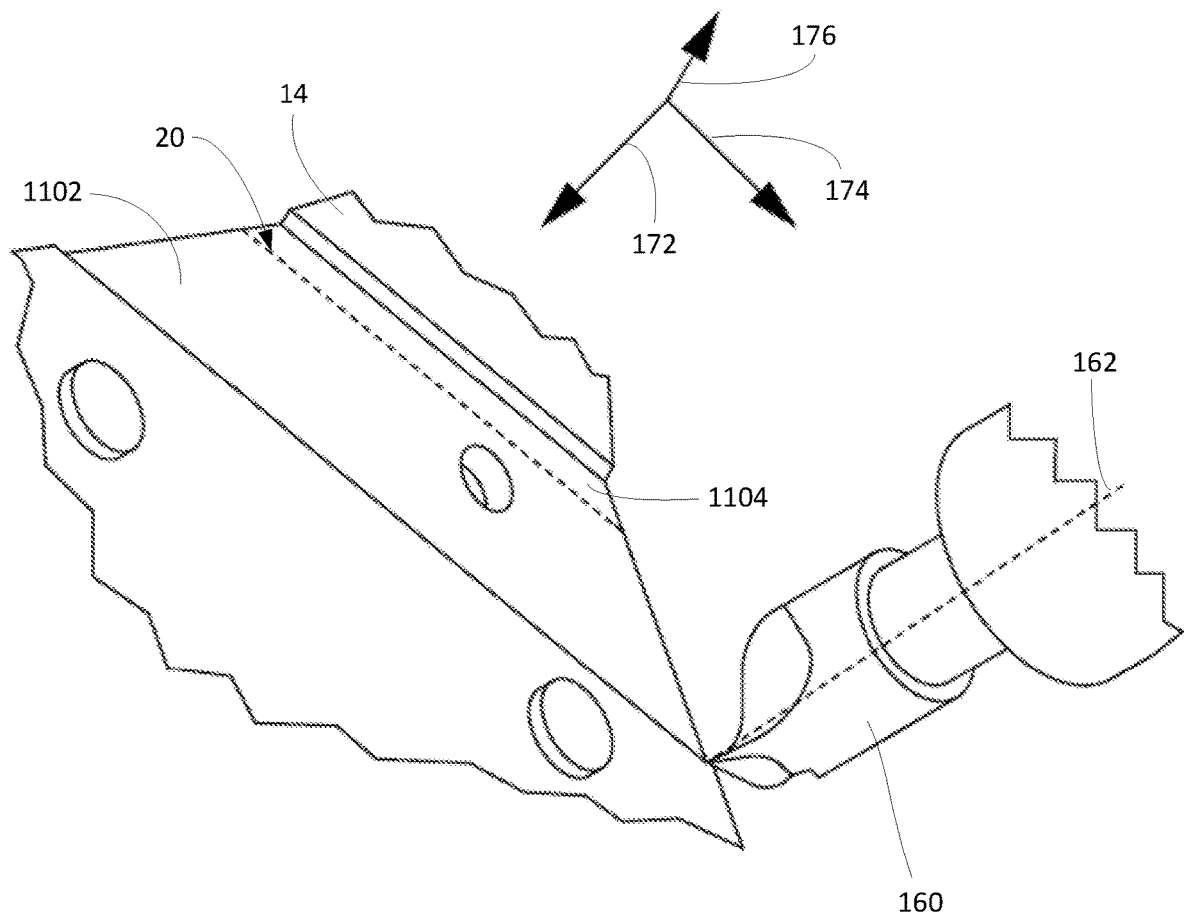
FIG. 11 shows an example of the milling cutter for making a cut on the surface of the fuselage attachment fitting.

FIG. 11 show an example of the milling cutter 160 for making a cut on the surface of the fuselage attachment fitting 14. In this example, the milling cutter 160 is an endmill having an endmill shank that is oriented along the rotational cutter axis 162. The endmill shank is perpendicularly coupled to the drive shaft to be driven by the drive shaft to rotate the endmill around the rotational cutter axis 162. Movement of the first linear bearing 36 in the first linear direction moves the milling cutter 160 in a length direction 172 along the length of the cut, which is parallel to the generally linear contact region 20. The length of the cut is only limited to the travel of the slide of the first linear bearing 36. Adjustment of the second linear bearing 46 in the second linear direction adjusts the milling cutter 160 in a depth direction 174 to set a depth position of the cut. Rotational adjustment of the left side panel 72 around the adjustment axis 109 adjusts the milling cutter 160 in a width direction 176 along the width of the cut to set a width position of the cut. The width includes an exposed are 1102 of the fuselage attachment fitting 14 and an overlapped area 1104 of the fuselage attachment fitting 14 overlapped with the wing attachment fitting 12.

Figure 12A:
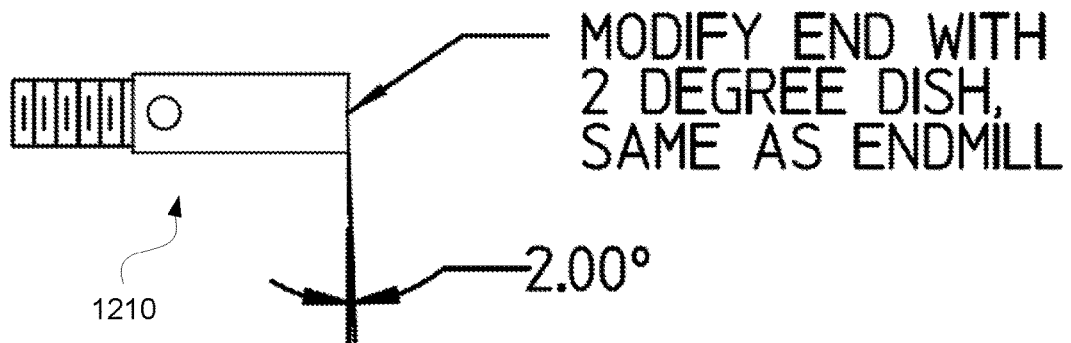
FIGS. 12A, 12B, and 12C show examples of cutting bits for the milling cutter.
Figure 12B:
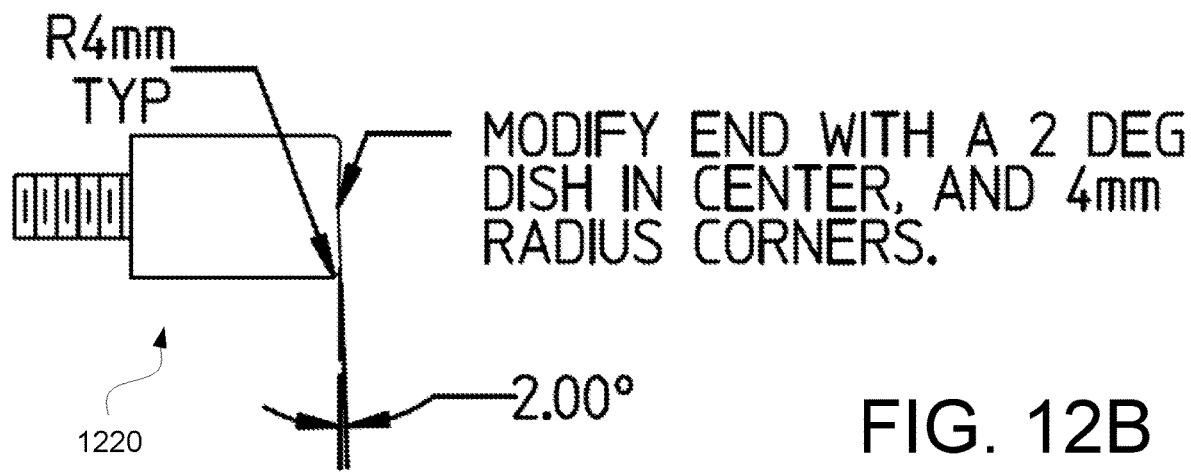
Figure 12C:
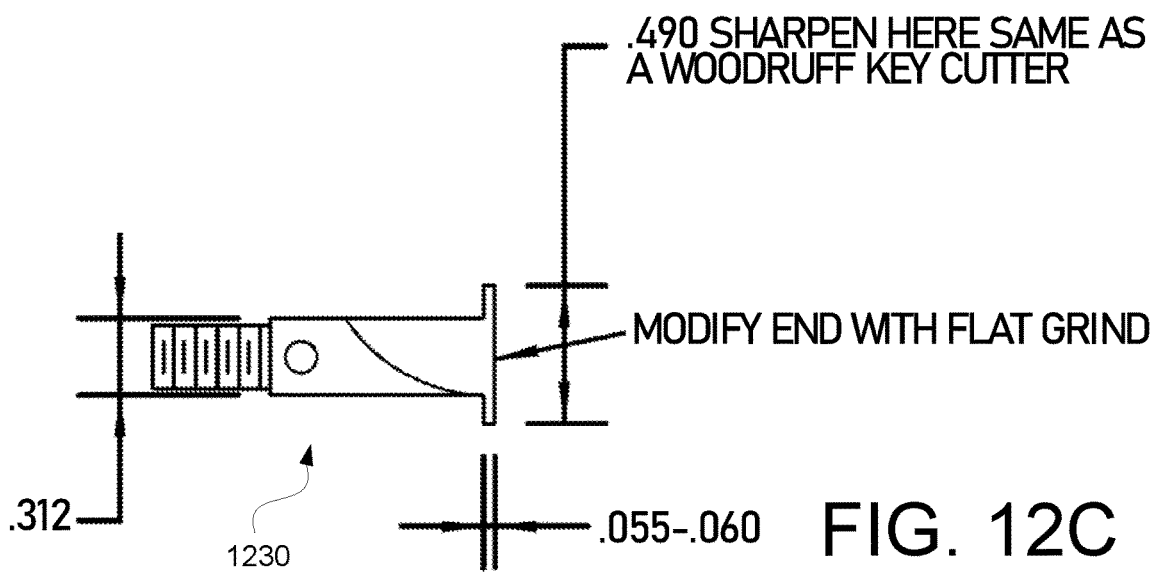

FIGS. 12A, 12B, and 12C show examples of cutting bits for the milling cutter 160. The first is a milling bit 1210 having the end modified with a 2-degree dish, same as an endmill. It has a shank diameter of about 0.312 inches. The second is a 4-mm radius bit 1220 having the end modified with a 2-degree dish in the center and 4-mm radius corners. It has a shank diameter of about 0.422 inches. The third is an undercut bit 1230 having the end modified with a flat grind and sharpened in the same manner as a Woodruff key cutter. It has a shank diameter of about 0.312 inches. Each cutter bit has ¼-28 threaded proximal end to thread into the distal end of the milling cutter 160. The first two bits (1210, 1220) are used for cutting the exposed area 1102 to reduce stress concentration. The third bit 1230 is used for cutting the overlapped area 1104. Depending on the amount of area that needs to be relieved, the first bit 1210 is used for the primary surface cutting across the exposed area 1102, followed by the use of the second bit 1220 to provide the required 4-mm radius in the exposed area 1102 to reduce the stress concentration (90-degree cut) which would be present if only the first bit 1210 were utilized for cutting the exposed area 1102. Therefore, the first bit 1210 is used as the primary cutting bit and the second bit 1220 is used as the secondary bit to achieve the finished cut with reduced inherent stresses from the initial cut using the first bit 1210.

Figure 13:
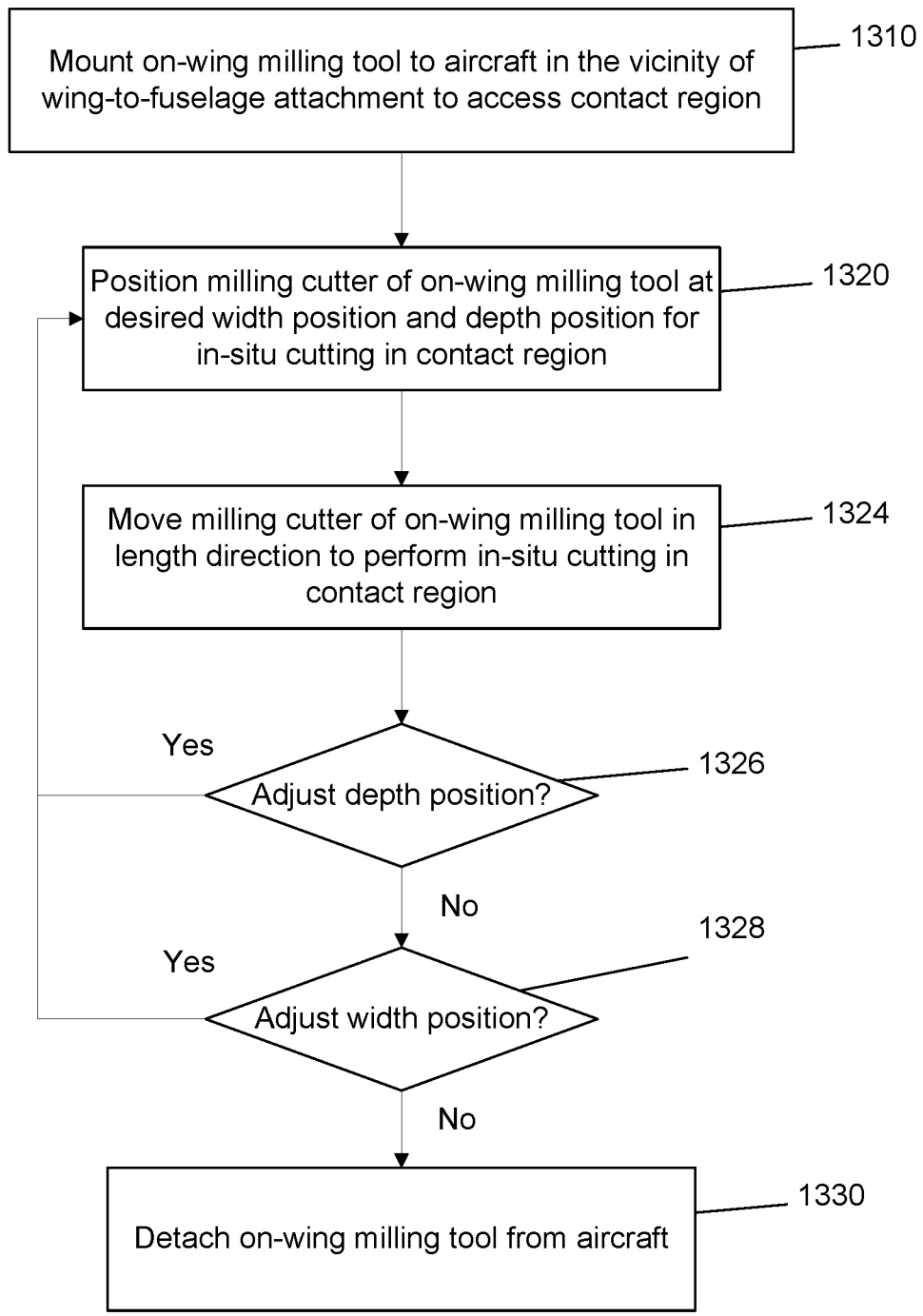
FIG. 13 is a flow diagram illustrating a process of performing in-situ cutting on the wing-to-fuselage attachment in the contact region.

FIG. 13 is a flow diagram illustrating a process of performing in-situ cutting on the wing-to-fuselage attachment in the contact region 20. In step 1310, the milling tool 150 including the milling cutter 160 is mounted to the aircraft in the vicinity of the wing-to-fuselage attachment to access the contact region 20. More specifically, the milling tool 150 is mounted to the wing attachment fitting 12 as shown in FIGS. 9-11 for cutting the fuselage attachment fitting 14 in the contact region 20. The cutting bits 1210, 1220, 1230 may be used to cut the exposed area 1102 and overlapped area 1104 adjacent to the contact region 20 of the fuselage attachment fitting 14. The depth of the cut is up to about 1 mm (about 0.04 inches) to a few mm in specific examples.

In step 1320, the milling cutter 160 is positioned at the desired width position and the desired depth position. To adjust the width position of the cut to be made in the width direction 176 (FIG. 11), the left side panel 72 is rotatably adjusted relative to the center block 62 via the slots 114 (FIG. 9) and 112 (FIG. 10). To adjust the depth position of the cut in the depth direction 174, the second knob 48 is used to move the second linear bearing 46 in the second linear direction.

In the embodiment shown in FIGS. 9-11, the second linear direction is parallel to the rotational cutter axis 162. In step 1324, the milling cutter 160 is moved in the length direction 172 to make the cut on the surface of the fuselage attachment fitting 14 on the inboard side. This is achieved by moving the first linear bearing 36 in the first linear direction using the first knob 38 and handle 40. Typically, the cut is made from one end to the other along the entire length. In step 1326, it is determined whether the depth position of the cut needs to be adjusted. For example, if a greater depth is desired, the depth position is adjusted and the milling cutter 160 is moved in the length direction 172 to make a deeper cut.

After the depth position of the milling cutter 160 is adjusted, steps 1320 to 1324 are repeated to move the milling cutter 160 in the length direction to make the cut at the desired width position and depth position. The depth adjustment in step 1326 may be made multiple times to achieve the target depth of the cut. Each cut is typically made with a depth adjustment of about 0.015 inches (about 0.38 mm).

In step 1328, it is determined whether the width position of the cut needs to be adjusted. For example, if a wider cut is desired, the width position of the milling cutter 160 is adjusted by rotatably adjusting the left side panel 72 relative to the center block 62. The width position adjustment is slotted for variable adjustment. In a specific example, the first and second cutting bits 1210, 1220 are used to cut the exposed area 1102 by adjusting the width position of the cutting bit from a width position away from the contact region 20 to a width position as close to the contact region 20 of the fuselage attachment fitting 14 as possible without making contact with the edge of the wing attachment fitting 12. The third cutting bit 1230 is used to cut the overlapped area 1104 by adjusting the width position of the cutting bit, also without making contact with the edge of the wing attachment fitting 12. After the width position of the milling cutter 160 is adjusted, steps 1320 to 1324 are repeated to move the milling cutter 160 in the length direction to make the cut at the desired width position and depth position. The width position adjustment in step 1328 will typically be made multiple times to achieve the target width of the cut. If no additional adjustments to the width position or depth position of the cut are needed, the cut with the desired width and depth is made. The milling tool 150 can be detached from the aircraft in step 1330.

In a specific example, the length of the contact region is about 28 mm, the length of the cut is about 20-40 mm, the depth of the cut is at least about 1 mm (about 0.042 inches), and the width of the cut is about 20 mm (the width extending on both sides of the length of the contact region 20 including the exposed side and the overlapped side, see FIG. 11). Using a cutter bit having a shank diameter (e.g., about 0.312 to 0.422 inches), typically 3 cutting passes in the length direction 172 are made to achieve the desired depth of about 1 mm, and several width position adjustments in the width direction (e.g., each width position adjustment is about 0.2 inches) and corresponding cutting passes in the length direction 172 are made to achieve the desired width of about 20 mm.

The inventive concepts taught by way of the examples discussed above are amenable to modification, rearrangement, and embodiment in several ways. For example, while the cutting operation can be performed manually by a maintenance person, at least some of the cutting operation can be automated utilizing computer control. More specifically, the first and second linear motors 36, 46 can be coupled to a computer programmable controller to control the depth position of the cut in the depth direction 174 and to control movement of the milling cutter 160 to make the cut in the length direction 172. Furthermore, the positions of the first and second linear motors 36, 46 may be switched. As mentioned above, the slots 114, 112 for rotational adjustment of the milling tool 150 to adjust the width position of the cut are provided in the side panel 100. In a different embodiment, one or more of the slots may be provided in the center block 62 instead to achieve the rotational adjustment between the side panel 100 and the center block 62. A different cutting tool can be used instead of a milling cutter having an endmill. Accordingly, although the present disclosure has been described with reference to specific embodiments and examples, persons skilled in the art will recognize that changes may be made in form and detail without departing from the spirit and scope of the disclosure.

What is claimed is:

1. An on-wing apparatus for in-situ cutting on a wing-to-fuselage attachment of a wing and a fuselage of an aircraft, the on-wing apparatus comprising:
    a first linear bearing disposed on a first mount plate to provide movement of the first linear bearing in a first linear direction with respect to the first mount plate, the first mount plate being configured to be attached to the aircraft in vicinity of the wing-to-fuselage attachment;
    a second linear bearing disposed on a second mount plate to provide movement of the second linear bearing in a second linear direction with respect to the second mount plate, the second mount plate being attached to the first linear bearing to move with the first linear bearing in the first linear direction with respect to the first mount plate;

a tool mounting member attached to the second linear bearing to move with the second linear bearing in the second linear direction with respect to the second mount plate which moves with the first linear bearing in the first linear direction with respect to the first mount plate; and a cutter attached to the tool mounting member to be adjustable, relative to the second linear bearing, in a tool mount rotational direction around an adjustment axis;

one of the first linear direction and the second linear direction being a depth direction of a depth of a cut to be made on the wing-to-fuselage attachment, which is parallel to the adjustment axis, and the other of the first linear direction and the second linear direction being a length direction of a length of the cut; and a width position of the cut being determined by a rotational adjustment of the cutter with respect to the second linear bearing in the tool mount rotational direction around the adjustment axis;

the tool mounting member including:

a center portion attached to the second linear bearing to move with the second linear bearing;

a first side panel rotatably attached to a first side of the center portion to rotate relative to the center portion around the adjustment axis;

a second side panel rotatably attached to a second side of the center portion to rotate relative to the center portion around the adjustment axis;

at least one first fastener to releasably fasten the first side panel to the center portion via at least one first slot, at any first position of a plurality of first positions along the at least one first slot, the plurality of first positions being selectable along the at least one first slot by rotational adjustment of the first side panel relative to the center portion around the adjustment axis, the at least one first slot being provided in the center portion or the first side panel; and at least one second fastener to releasably fasten the second side panel to the center portion via at least one second slot, at any second position of a plurality of second positions along the at least one second slot, the plurality of second positions being selectable along the at least one second slot by rotational adjustment of the second side panel relative to the center portion around the adjustment axis, the at least one second slot being provided in the center portion or the second side panel;

the cutter being attached (i) to the first side panel to move with the first side panel that is rotatably attached to the center portion, for cutting the wing-to-fuselage attachment located at a right side wing of the aircraft on an inboard side thereof for the first mount plate that is attached to the right side wing, or for cutting the wing-to-fuselage attachment located at a left-side wing of the aircraft on an outboard side thereof for the first mount plate that is attached to the left-side wing, or (ii) to the second side panel to move with the second side panel that is rotatably attached to the center portion, for cutting the wing-to-fuselage attachment located at the left-side wing on an inboard side thereof for the first mount plate that is attached to the left-side wing, or for cutting the wing-to-fuselage attachment located at the right side wing on an outboard side thereof for the first mount plate that is attached to the right side wing.

2. The on-wing apparatus of claim 1, wherein the center portion is disposed between the first side panel on the first side and the second side panel on the second side which is opposite from the first side; and wherein the first side panel, the center portion, and the second side panel are arranged to rotate relative to each other around the adjustment axis.

3. The on-wing apparatus of claim 1, wherein the cutter includes:

a rotary motor that is attached to the tool mounting member to be adjustable, relative to the second linear bearing, in the tool mount rotational direction around the adjustment axis, the rotary motor providing rotational drive to a drive shaft oriented along a rotary motor axis;

an endmill shank that is oriented along a rotational cutter axis and perpendicularly coupled to the drive shaft to be driven by the drive shaft, the rotational cutter axis being oriented parallel to the adjustment axis; and a cutting bit attached at an end of the endmill shank.

4. The on-wing apparatus of claim 3, wherein the cutter includes:

an endmill cutting bit to cut an exposed area of the wing-to-fuselage attachment; and an undercut cutting bit to cut an overlapped area of the wing-to-fuselage attachment between a trailing-edge wing attachment fitting and a fuselage attachment fitting.

5. The on-wing apparatus of claim 1, wherein the wing-to-fuselage attachment includes a trailing-edge wing attachment fitting attached to a fuselage attachment fitting, the on-wing apparatus further comprising:

a plurality of aircraft mounts to mount the first mount plate, along a plurality of edges of the first mount plate, to a flange of the trailing-edge wing attachment fitting, for making the cut on the fuselage attachment fitting.

6. An on-wing apparatus for in-situ cutting on a wing-to-fuselage attachment of a wing and a fuselage of an aircraft, the on-wing apparatus comprising:

a first linear bearing disposed on a first mount plate to provide movement of the first linear bearing in a first linear direction with respect to the first mount plate, the first mount plate being configured to be attached to the aircraft in vicinity of the wing-to-fuselage attachment;

a second linear bearing disposed on a second mount plate to provide movement of the second linear bearing in a second linear direction with respect to the second mount plate, the second mount plate being attached to the first linear bearing to move with the first linear bearing in the first linear direction with respect to the first mount plate;

a tool mounting member attached to the second linear bearing to move with the second linear bearing in the second linear direction with respect to the second mount plate which moves with the first linear bearing in the first linear direction with respect to the first mount plate; and a cutter attached to the tool mounting member to be adjustable, relative to the second linear bearing, in a tool mount rotational direction around an adjustment axis;

one of the first linear direction and the second linear direction being a depth direction of a depth of a cut to be made on the wing-to-fuselage attachment, which is parallel to the adjustment axis, and the other of the first linear direction and the second linear direction being a length direction of a length of the cut; and a width position of the cut being determined by a rotational adjustment of the cutter with respect to the second linear bearing in the tool mount rotational direction around the adjustment axis;

the cutter including:
  a rotary motor that is attached to the tool mounting member to be adjustable, relative to the second linear bearing, in the tool mount rotational direction around the adjustment axis, the rotary motor providing rotational drive to a drive shaft oriented along a rotary motor axis;
  an endmill shank that is oriented along a rotational cutter axis and perpendicularly coupled to the drive shaft to be driven by the drive shaft, the rotational cutter axis being oriented parallel to the adjustment axis;
  an endmill cutting bit configured to be attached to an end of the endmill shank to cut an exposed area of the wing-to-fuselage attachment; and
  an undercut cutting bit configured to be attached to an end of the endmill shank to cut an overlapped area of the wing-to-fuselage attachment between a trailing-edge wing attachment fitting and a fuselage attachment fitting.

7. The on-wing apparatus of claim 6, wherein the tool mounting member includes:
  a center portion attached to the second linear bearing to move with the second linear bearing;
  a first side panel rotatably attached to the center portion to rotate relative to the center portion around the adjustment axis; and
  at least one first fastener to releasably fasten the first side panel to the center portion via at least one first slot, at any first position of a plurality of first positions along the at least one first slot, the plurality of first positions being selectable along the at least one first slot by rotational adjustment of the first side panel relative to the center portion around the adjustment axis, the at least one first slot being provided in the center portion or the first side panel;
  the cutter being attached to the first side panel to move with the first side panel.

8. The on-wing apparatus of claim 6, wherein the tool mounting member includes:
  a center portion attached to the second linear bearing to move with the second linear bearing;
  a first side panel rotatably attached to a first side of the center portion to rotate relative to the center portion around the adjustment axis;
  a second side panel rotatably attached to a second side of the center portion to rotate relative to the center portion around the adjustment axis;
  at least one first fastener to releasably fasten the first side panel to the center portion via at least one first slot, at any first position of a plurality of first positions along the at least one first slot, the plurality of first positions being selectable along the at least one first slot by rotational adjustment of the first side panel relative to the center portion around the adjustment axis, the at least one first slot being provided in the center portion or the first side panel; and
  at least one second fastener to releasably fasten the second side panel to the center portion via at least one second slot, at any second position of a plurality of second positions along the at least one second slot, the plurality of second positions being selectable along the at least one second slot by rotational adjustment of the second side panel relative to the center portion around the adjustment axis, the at least one second slot being provided in the center portion or the second side panel;
  the cutter being attached (i) to the first side panel to move with the first side panel that is rotatably attached to the center portion, for cutting the wing-to-fuselage attachment located at a right side wing of the aircraft on an inboard side thereof for the first mount plate that is attached to the right side wing, or for cutting the wing-to-fuselage attachment located at a left-side wing of the aircraft on an outboard side thereof for the first mount plate that is attached to the left-side wing, or (ii) to the second side panel to move with the second side panel that is rotatably attached to the center portion, for cutting the wing-to-fuselage attachment located at the left-side wing on an inboard side thereof for the first mount plate that is attached to the left-side wing, or for cutting the wing-to-fuselage attachment located at the right side wing on an outboard side thereof for the first mount plate that is attached to the right side wing.

9. The on-wing apparatus of claim 8,
  wherein the center portion is disposed between the first side panel on the first side and the second side panel on the second side which is opposite from the first side; and
  wherein the first side panel, the center portion, and the second side panel are arranged to rotate relative to each other around the adjustment axis.

10. The on-wing apparatus of claim 6, wherein the wing-to-fuselage attachment includes a trailing-edge wing attachment fitting attached to a fuselage attachment fitting, the on-wing apparatus further comprising:
  a plurality of aircraft mounts to mount the first mount plate, along a plurality of edges of the first mount plate, to a flange of the trailing-edge wing attachment fitting, for making the cut on the fuselage attachment fitting.

11. An on-wing apparatus for in-situ cutting on a wing-to-fuselage attachment of a wing and a fuselage of an aircraft, the on-wing apparatus comprising:
  a first linear bearing disposed on a first mount plate to provide movement of the first linear bearing in a first linear direction with respect to the first mount plate, the first mount plate being configured to be attached to the aircraft in vicinity of the wing-to-fuselage attachment;
  a second linear bearing disposed on a second mount plate to provide movement of the second linear bearing in a second linear direction with respect to the second mount plate, the second mount plate being attached to the first linear bearing to move with the first linear bearing in the first linear direction with respect to the first mount plate;
  a tool mounting member attached to the second linear bearing to move with the second linear bearing in the second linear direction with respect to the second mount plate which moves with the first linear bearing in the first linear direction with respect to the first mount plate; and
  cutting means attached to the tool mounting member to be adjustable, relative to the second linear bearing, in a tool mount rotational direction around an adjustment axis;
  one of the first linear direction and the second linear direction being a depth direction of a depth of a cut to be made on the wing-to-fuselage attachment, which is parallel to the adjustment axis, and the other of the first linear direction and the second linear direction being a length direction of a length of the cut; and a width position of the cut being determined by a rotational adjustment of the cutter with respect to the second linear bearing in the tool mount rotational direction around the adjustment axis;

the tool mounting member including:

a center portion attached to the second linear bearing to move with the second linear bearing;

a first side panel rotatably attached to a first side of the center portion to rotate relative to the center portion around the adjustment axis;

a second side panel rotatably attached to a second side of the center portion to rotate relative to the center portion around the adjustment axis;

at least one first fastener to releasably fasten the first side panel to the center portion via at least one first slot, at any first position of a plurality of first positions along the at least one first slot, the plurality of first positions being selectable along the at least one first slot by rotational adjustment of the first side panel relative to the center portion around the adjustment axis, the at least one first slot being provided in the center portion or the first side panel; and at least one second fastener to releasably fasten the second side panel to the center portion via at least one second slot, at any second position of a plurality of second positions along the at least one second slot, the plurality of second positions being selectable along the at least one second slot by rotational adjustment of the second side panel relative to the center portion around the adjustment axis, the at least one second slot being provided in the center portion or the second side panel;

the cutting means being attached (i) to the first side panel to move with the first side panel that is rotatably attached to the center portion, for cutting the wing-to-fuselage attachment located at a right side wing of the aircraft on an inboard side thereof for the first mount plate that is attached to the right side wing, or for cutting the wing-to-fuselage attachment located at a left-side wing of the aircraft on an outboard side thereof for the first mount plate that is attached to the left-side wing, or (ii) to the second side panel to move with the second side panel that is rotatably attached to the center portion, for cutting the wing-to-fuselage attachment located at the left-side wing on an inboard side thereof for the first mount plate that is attached to the left-side wing, or for cutting the wing-to-fuselage attachment located at the right side wing on an outboard side thereof for the first mount plate that is attached to the right side wing.

12. The on-wing apparatus of claim 11, wherein the center portion is disposed between the first side panel on the first side and the second side panel on the second side which is opposite from the first side; and wherein the first side panel, the center portion, and the second side panel are arranged to rotate relative to each other around the adjustment axis.

13. The on-wing apparatus of claim 11, wherein the cutting means comprises a rotary cutting means attached to the tool mounting member to be adjustable, relative to the second linear bearing, in the tool mount rotational direction around the adjustment axis, the rotary cutting means being rotationally driven around a rotary cutting axis.

14. The on-wing apparatus of claim 11, wherein the wing-to-fuselage attachment includes a trailing-edge wing attachment fitting attached to a fuselage attachment fitting, the on-wing apparatus further comprising:

a plurality of aircraft mounts to mount the first mount plate, along a plurality of edges of the first mount plate, to a flange of the trailing-edge wing attachment fitting, for making the cut on the fuselage attachment fitting.

\* \* \* \* \*